(12) United States Patent
Feld et al.

(10) Patent No.: US 9,228,549 B2
(45) Date of Patent: Jan. 5, 2016

(54) SOUND ATTENUATOR OF AN EXHAUST-GAS TURBOCHARGER

(71) Applicant: ABB TURBO SYSTEMS AG, Baden (CH)

(72) Inventors: Heinz-Jürgen Feld, Niederwil (CH); Llija Mrvelj, Zürich (CH); Philipp Meyer, Herrliberg (CH)

(73) Assignee: ABB TURBO SYSTEMS AG, Baden (CH)

( * ) Notice: Subject to any disclaimer, the term of this patent is extended or adjusted under 35 U.S.C. 154(b) by 49 days.

(21) Appl. No.: 14/199,583

(22) Filed: Mar. 6, 2014

(65) Prior Publication Data

US 2014/0251719 A1    Sep. 11, 2014

(30) Foreign Application Priority Data

Mar. 6, 2013    (DE) .......................... 10 2013 203 827

(51) Int. Cl.

| | |
|---|---|
| *F02M 35/12* | (2006.01) |
| *F04D 29/66* | (2006.01) |
| *F04D 25/02* | (2006.01) |
| *F04D 29/42* | (2006.01) |
| *F04D 29/70* | (2006.01) |
| *F02C 7/045* | (2006.01) |

(52) U.S. Cl.
CPC ............ *F02M 35/1272* (2013.01); *F02C 7/045* (2013.01); *F04D 25/024* (2013.01); *F04D 29/4213* (2013.01); *F04D 29/664* (2013.01); *F04D 29/701* (2013.01); *F05D 2220/40* (2013.01)

(58) Field of Classification Search
CPC ....................................................... F02M 35/12
USPC ............................................................ 181/229
See application file for complete search history.

(56) References Cited

U.S. PATENT DOCUMENTS

| | | | | |
|---|---|---|---|---|
| 2,959,243 | A | | 11/1960 | Smith |
| 3,177,972 | A | * | 4/1965 | Wirt .............................. 181/268 |
| 4,236,597 | A | * | 12/1980 | Kiss et al. ..................... 181/224 |
| 4,371,054 | A | * | 2/1983 | Wirt .............................. 181/252 |

(Continued)

FOREIGN PATENT DOCUMENTS

| | | |
|---|---|---|
| DE | 529 561 C | 7/1931 |
| DE | 1669265 U | 12/1953 |

(Continued)

OTHER PUBLICATIONS

Germany Search Report.

*Primary Examiner* — Forrest M Phillips
(74) *Attorney, Agent, or Firm* — Buchanan Ingersoll & Rooney PC (57) ABSTRACT

A sound attenuator on the intake side of a compressor of an exhaust-gas turbocharger includes a tubular sound attenuator housing, which encases a flow duct between a face-side inlet opening and a rear-side outlet opening. A holding plate is provided in the sound attenuator housing in the flow direction and is perforated in the flow direction. For example, the holding plate can have a multiplicity of holes extending in the flow direction. The sound attenuator on the intake side of the compressor of an exhaust-gas turbocharger has a compact, lightweight and inexpensive structural form. The intake air is subjected to low resistance as it flows through the attenuation elements.

20 Claims, 8 Drawing Sheets

(56) References Cited

U.S. PATENT DOCUMENTS

| | | | |
|---|---|---|---|
| 7,694,660 B2* | 4/2010 | Koss | 123/184.53 |
| 8,215,448 B2* | 7/2012 | Harting et al. | 181/229 |
| 2003/0150671 A1* | 8/2003 | Kerr | 181/264 |
| 2004/0065504 A1 | 4/2004 | Daniels | |
| 2009/0038880 A1* | 2/2009 | Asada et al. | 181/229 |
| 2009/0060759 A1 | 3/2009 | Sishtla et al. | |
| 2009/0068028 A1 | 3/2009 | Sishtla | |

FOREIGN PATENT DOCUMENTS

| | | |
|---|---|---|
| DE | 1 447 988 A1 | 5/1969 |
| DE | 295 11 979 U1 | 9/1995 |
| DE | 197 03 414 A1 | 8/1998 |
| DE | 100 22 240 A1 | 11/2001 |
| DE | 10 2009 048 453 A1 | 5/2010 |
| EP | 0 574 605 A1 | 12/1993 |
| EP | 0 740 080 A2 | 10/1996 |
| JP | 9-209853 A | 8/1997 |
| JP | 2000-45782 A | 2/2000 |
| JP | 2002-4964 A | 1/2002 |
| JP | 2003-83185 A | 3/2003 |
| KR | 10-2008-0008664 A | 1/2008 |
| WO | WO 97/41345 A1 | 11/1997 |
| WO | WO 2006/115461 A1 | 11/2006 |
| WO | WO 2011/048323 A2 | 4/2011 |

* cited by examiner

Fig. 9b

SOUND ATTENUATOR OF AN EXHAUST-GAS TURBOCHARGER

RELATED APPLICATION

This application claims priority under 35 U.S.C. §120 to DE 102013203827.5 which was filed in Germany on Mar. 6, 2013, the entire content of which is hereby incorporated by reference in its entirety.

FIELD

The present disclosure relates to supercharged internal combustion engines. More particularly, the present disclosure relates to a sound attenuator on the intake side of a compressor of an exhaust-gas turbocharger for the supercharging of an internal combustion engine, and to an exhaust-gas turbocharger having such a sound attenuator.

BACKGROUND INFORMATION

Sound attenuators can be used on the intake side of the compressor of an exhaust-gas turbocharger. Combustion air is compressed in the compressor, and the combustion air is subsequently supplied to the combustion chambers of an internal combustion engine. The compressor is driven by the exhaust-gas turbine of the exhaust-gas turbocharger. Sound attenuators can often additionally be provided with a filter. This is generally referred to as a filter-type sound attenuator.

The compressor inlet of a turbocharger generates noise which is made up substantially of so-called blade pass frequencies (rotational speed multiplied by the number of rotor blades of the compressor wheel) and a medium-frequency whooshing sound.

To attenuate the noise, use is made of intake sound attenuators. The aim of the sound attenuators is to attenuate the noise in certain frequency ranges and supply the flow with the desired flow profile to the compressor.

High frequencies to be attenuated require either small gaps between the attenuation elements, or diversions, in order to prevent the high frequencies from passing through. The slightly lower frequencies require greater absorption thicknesses in order for them to be attenuated in an effective manner.

Known sound attenuators can therefore either be formed with a multiplicity of inserted attenuation elements, which can be curved in order to prevent the pass-through effect, or have a lining, which is flush with a wall, and one or more diversions.

For example, EP 0574605 A1 discloses a filter-type sound attenuator which is composed of a cast monoblock. The attenuation elements can be arranged in the grooved radial ribs of the cast monoblock. A filter frame composed of a removable perforated plate part surrounds the sound attenuator in such a way that the attenuation elements can be secured against falling out radially. The perforated plate part is arranged annularly around the sound attenuator by means of connecting elements. A disk-shaped attenuation element is composed of four attenuation segments which, when assembled, constitute an annular surface. An absorption element is held by two punched perforated plates and thus forms an attenuation element which is inserted radially into the grooves of the above-mentioned ribs of the cast monoblock.

EP 0740080 A2 discloses a filter-type sound attenuator which is in the shape of a circular cylinder and in which the attenuation elements can be arranged, with their attenuation surfaces parallel to the central axis of the filter-type sound attenuator housing which is likewise cast as a monoblock, in grooves of the housing walls. The attenuation elements can be composed of an attenuation plate which encases an absorption element. When in the mounted state on the circumference of the filter-type sound attenuator, the attenuation plates, together with the coarse filter segments arranged thereon, form a coarse filter ring that is surrounded by an annular filter.

JP 2002-4964 discloses a filter-type sound attenuator having a multiplicity of cylindrical attenuation elements which can be arranged coaxially one inside the other and through which flow passes in an axial direction and which, to prevent the pass-through effect, can be of undulating form. A filter element is arranged on the inlet-side axial face side.

KR 2008-8664 discloses a filter-type sound attenuator having a multiplicity of conical attenuation elements which can be arranged coaxially one inside the other and through which flow passes obliquely with respect to the axial direction oriented flow ducts. The attenuation elements can be held by a holding plate that extends perpendicular to the flow direction. A filter element is arranged on the inlet-side face side.

SUMMARY

An exemplary embodiment of the present disclosure provides a sound attenuator on an intake side of a compressor of an exhaust-gas turbocharger. The exemplary sound attenuator includes a tubular sound attenuator housing which encases a flow duct between a face-side inlet opening and a rear-side outlet opening. A flow through the sound attenuator is directed from a central point of the inlet opening to a central point of the outlet opening. The exemplary sound attenuator also includes an attenuation body inserted into the sound attenuator housing in a direction of the flow. The attenuation body is perforated in the flow direction so as to have a plurality of holes extending in the flow direction. The attenuation body is divided into a plurality of attenuation mats arranged one behind the other in the flow direction.

BRIEF DESCRIPTION OF THE DRAWINGS

Additional refinements, advantages and features of the present disclosure are described in more detail below with reference to exemplary embodiments illustrated in the drawings, in which:

FIGS. 9a and 9b show views, in the flow direction, of the inlet opening of an exemplary embodiment of the sound attenuator in FIG. 2, wherein FIG. 9a shows the detail of a hole pattern conforming to the densest packing, and FIG. 9b illustrates the hole distribution according to an exemplary embodiment of the present disclosure.

DETAILED DESCRIPTION

Exemplary embodiments of the present disclosure provide a sound attenuator on the intake side of the compressor of an exhaust-gas turbocharger. The sound attenuator of the present disclosure has as a compact, lightweight and inexpensive structural form. In the sound attenuator according to the present disclosure, the intake air is subjected to low resistance as it flows through the sound attenuator.

Exemplary embodiments of the present disclosure provide a sound attenuator which includes a tubular sound attenuator housing. The sound attenuator housing encases a flow duct between a face-side inlet opening and a rear-side outlet opening. The flow direction through the sound attenuator is defined as the direction from the central point of the inlet opening to the central point of the outlet opening. In the sound attenuator housing, there is arranged a holding plate for the positioning of attenuation means in the flow direction. According to an exemplary embodiment of the present disclosure, the attenuation means include an attenuation body which can be inserted into the sound attenuator housing in the flow direction and which is perforated in the flow direction, that is to say has a multiplicity of openings (hereinafter also referred to as holes) extending in the flow direction. The attenuation body is divided into a plurality of attenuation mats arranged one behind the other in the flow direction.

According to an exemplary embodiment, the sound attenuator can include positioning means that define the angular position of the attenuation body with respect to the sound attenuator housing perpendicular to the flow direction, such that the attenuation body assumes the intended position within the sound attenuator housing and, for example, during assembly or during operation, does not depart from the position.

According to an exemplary embodiment, if multiple attenuation mats can be provided, the sound attenuator can include positioning means that define the position of the attenuation mats relative to one another with regard to their perforation, such that the individual attenuation mats can be arranged correctly one behind the other in the flow direction, such that a correct flow through the multiple attenuation mat layers is ensured.

The above-described positioning means can include, for example, a pin, which is fastened to a holding plate and/or to the sound attenuator housing, and a positioning hole, provided for the pin, in the attenuation body or in the attenuation mats.

The holes of the perforation of the attenuation body optionally have different cross sections than one another. According to an exemplary embodiment, the holes in the attenuation body in the edge region of the flow duct have larger or smaller cross sections than holes in the attenuation body in the center of the flow duct.

According to an exemplary embodiment, the holes in the attenuation body can be formed and/or arranged such that the holes form an open hole area, averaged over the radius, with a uniform distribution with respect to angle. In this way, it is possible for relatively small sound attenuators to be manufactured with the same overall hole area as in the case of an arrangement of the holes conforming to the densest packaging, in which uniformly distributed circular holes of identical form can be arranged in each case spaced apart at uniform intervals of 60° angle from one another. The 60°-cycle symmetry resulting from the arrangement conforming to the densest packaging, and the uneven distribution of the open hole area, averaged over the radius, with respect to angle, can lead to a sixth order blade excitation. For example, it has been found that an uneven distribution of the open hole area, averaged over the radius, with respect to angle can lead to a situation in which the amount of medium drawn in varies with respect to angle, which can lead to the above-mentioned undesired excitation of the rotor blades of the compressor wheel.

According to an exemplary embodiment, at least one of the holes of the perforation of the attenuation body has a non-constant cross section in the flow direction.

According to an exemplary embodiment, at least one of the holes of the perforation of the attenuation body extends in a manner deviating from the flow direction such that the inlet opening and outlet opening of the hole have no overlap in the flow direction.

According to an exemplary embodiment, the attenuation body and the sound attenuator housing can have a circular, oval or polygonal cross section in the region of the attenuation body.

According to an exemplary embodiment, the sound attenuator housing can have, in the region of the attenuation body, a cross-sectional area larger than the area of the outlet opening of the sound attenuator housing.

According to an exemplary embodiment, the sum of all of the inlet openings of the perforation in the attenuation body corresponds at least to the area of the outlet opening of the sound attenuator housing.

According to an exemplary embodiment, the attenuation body is held on both sides in the flow direction by in each case one perforated holding plate.

According to an exemplary embodiment, the sound attenuator can be in the form of a filter-type sound attenuator due to a filter being arranged, transversely with respect to the flow duct, in the region of the inlet opening of the sound attenuator housing.

Figure 1:
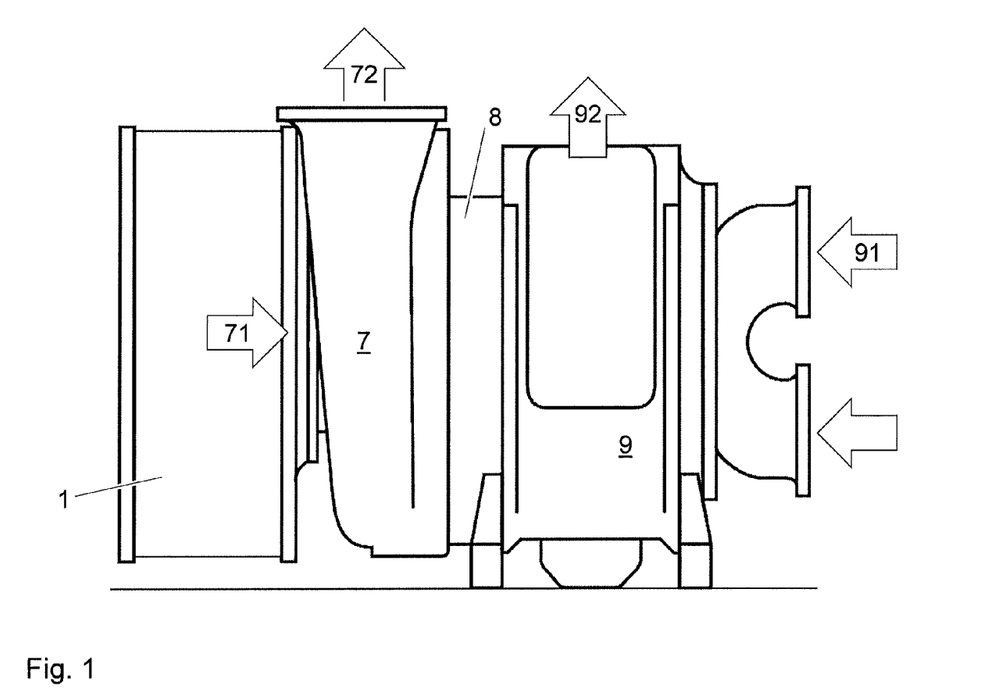
FIG. 1 is a schematic illustration of an exhaust-gas turbocharger having a known sound attenuator art positioned upstream of the compressor, wherein the inflow and outflow of the exhaust gas and of the fresh air can be indicated by arrows.

As already mentioned, sound attenuators of this type can be used on the intake side of the compressor of an exhaust-gas turbocharger. FIG. 1 schematically shows such a use. Fresh air drawn in via the filter-type sound attenuator 1 is compressed in the compressor 7. The arrow 71 designates the air inlet of the compressor 7. The compressed air is subsequently supplied via the air outlet 72 to the combustion chambers of the internal combustion engine. The compressor wheel in the interior of the compressor housing is driven by a turbine wheel. The turbine wheel is impinged on by hot exhaust gases from the combustion chambers of an internal combustion engine, and the exhaust gas is conducted into the turbine housing via the gas inlet 91. Downstream of the turbine wheel, the exhaust gas is supplied via the gas outlet 92 to an exhaust system.

Figure 2:
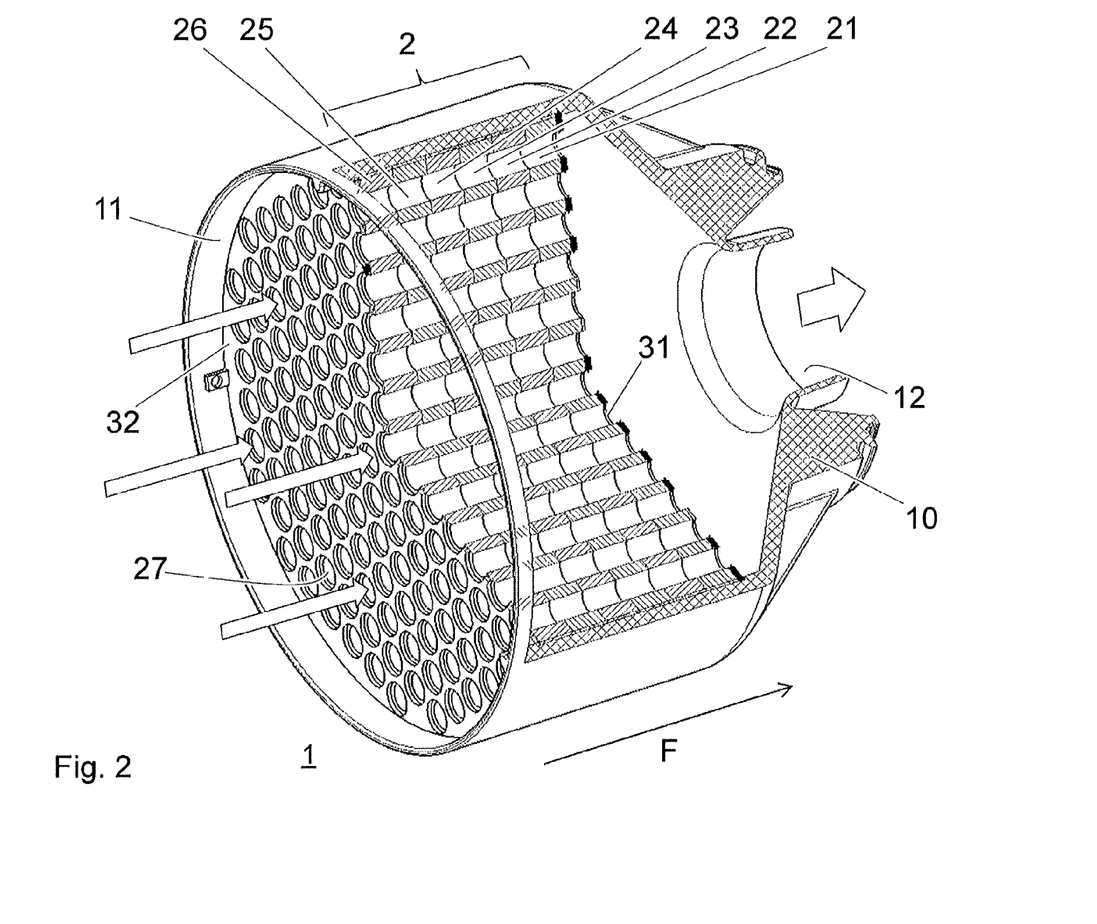
FIG. 2 is an isometric illustration of a sound attenuator designed according to an exemplary embodiment of the present disclosure, wherein the sound attenuator, which is constructed from multiple attenuation mats, is illustrated in partially cut-away form, and the housing of the sound attenuator is illustrated in partially transparent form.
Figure 3:
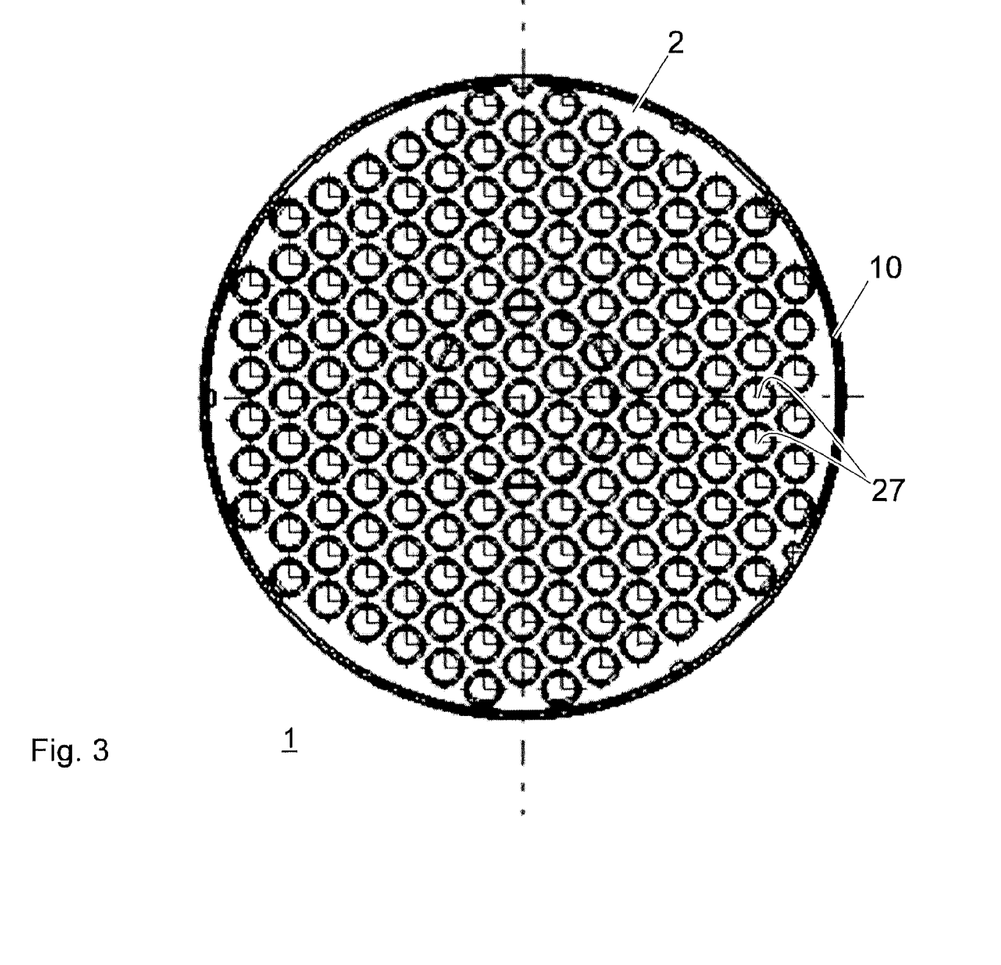
FIG. 3 shows a view, in the flow direction F, of the inlet opening of the sound attenuator in FIG. 2.
Figure 4:
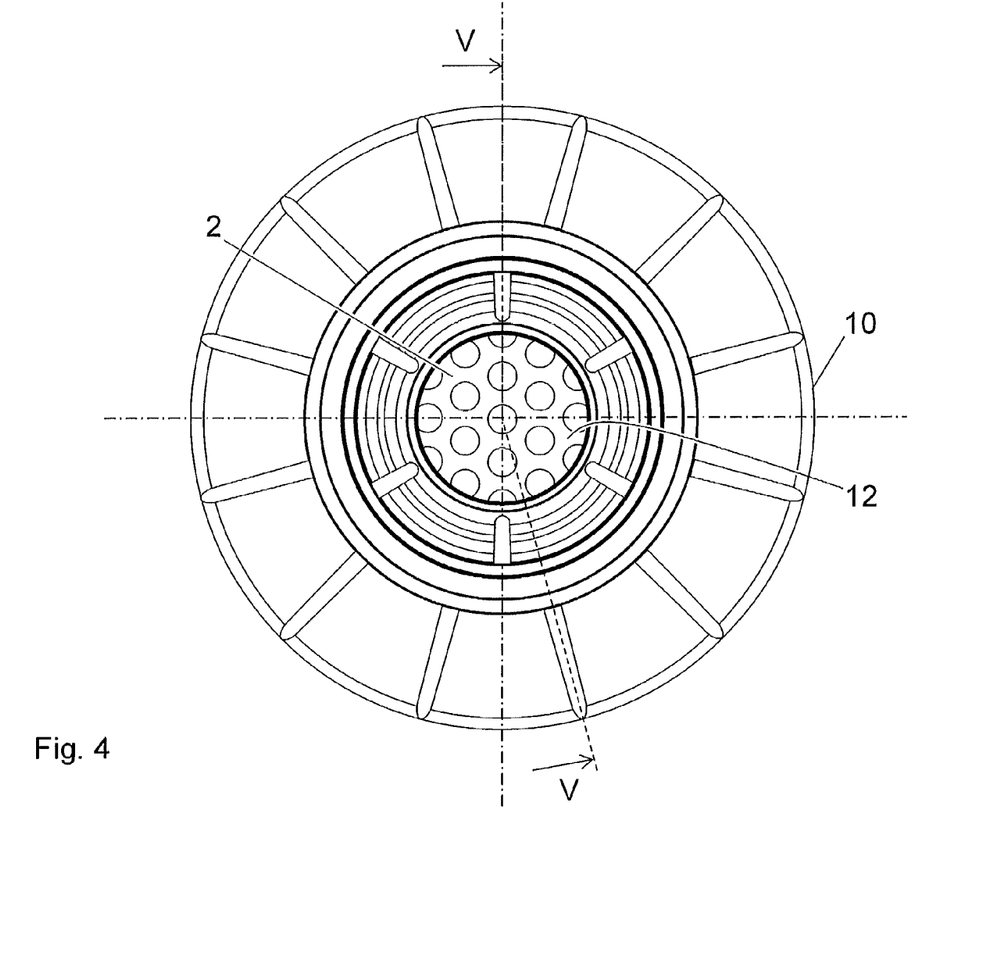
FIG. 4 shows a view, counter to the flow direction S, of the rear side, provided with the outlet opening, of the sound attenuator in FIG. 2.
Figure 5:
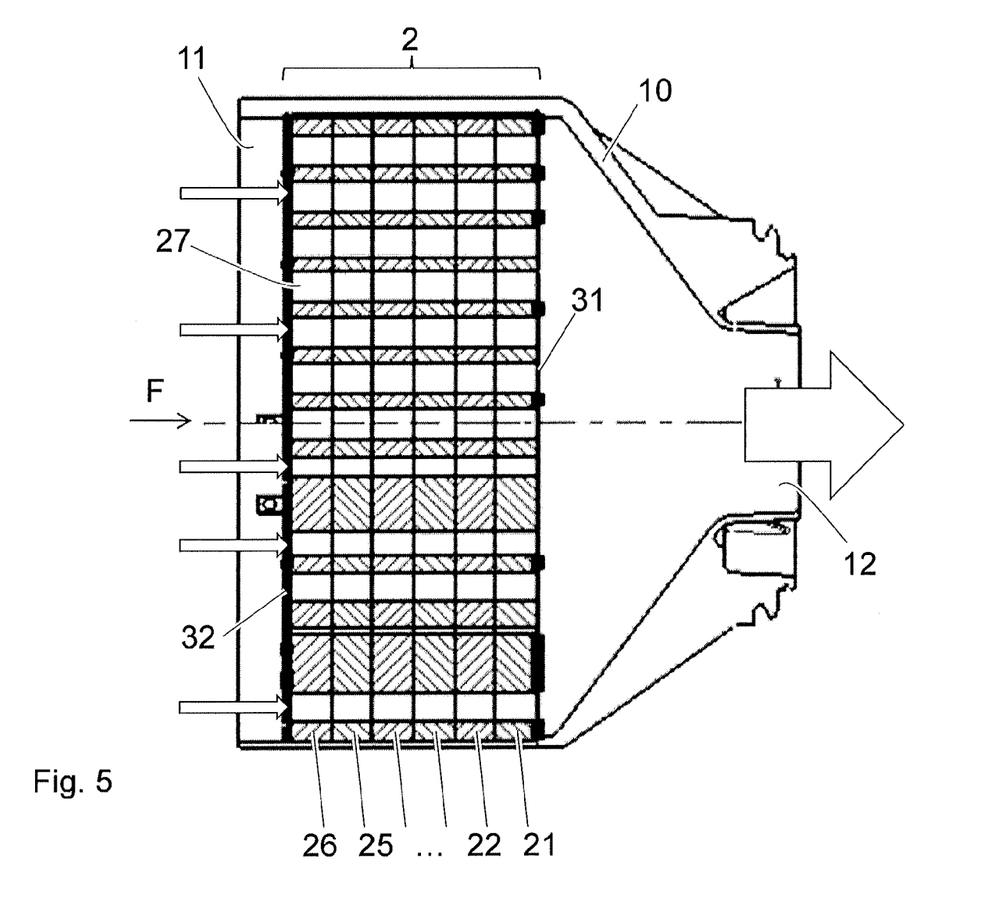
FIG. 5 shows a section, along the line V-V and in the flow direction S, through the sound attenuator in FIG. 4.
Figure 6:
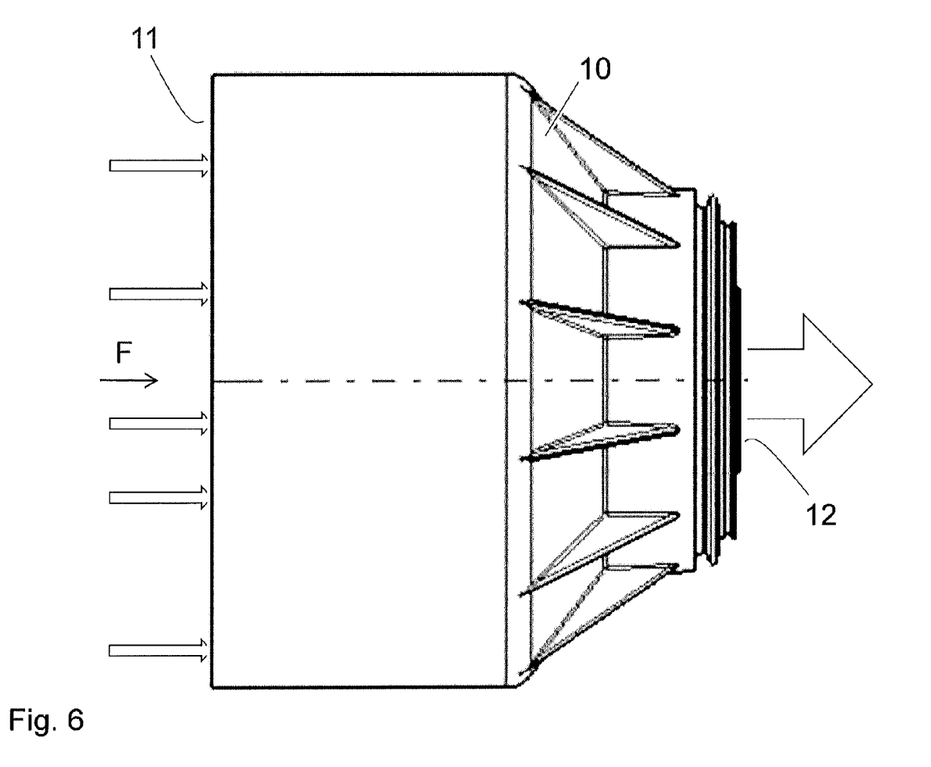
FIG. 6 shows a view of the sound attenuator in FIG. 2 from the side.

FIG. 2 shows an isometric illustration of a sound attenuator according to an exemplary embodiment of the present disclosure. The arrows indicate the fresh-air flow. The tubular housing 10 of the sound attenuator has an inlet opening 11 and an outlet opening 12, wherein the two openings 11, 12 can be arranged on opposite face sides of the tubular housing 10, which results, during operation, in a throughflow in the pipe direction (in the illustrated embodiment with a circular cross section, this corresponds to the axial direction). Owing to the omission of a diversion of the flow, low pressure losses can be achieved such as in the case of known sound attenuators with radial inflow.

According to an exemplary embodiment, the sound attenuator housing can be realized in the form of a unipartite cast housing. According to an exemplary embodiment, the filter already mentioned above can be arranged in the region of the inlet opening 11, where the filter prevents relatively large objects from passing with the airflow into the compressor and into the combustion chambers of the internal combustion engine during operation. On the side of the outlet opening 12, the sound attenuator can include fastening means by which the sound attenuator and the compressor housing can be connected. Such fastening means can be, for example, encircling projections and/or fastening openings for the insertion of screws. Here, the housing of the sound attenuator can bear against and/or be fastened to the compressor housing at one or more locations.

According to an exemplary embodiment of the present disclosure, the sound attenuator includes an attenuation body 2 which, in the illustrated embodiment, is composed of multiple attenuation mats 21-26. The illustrated number of mats is exemplary, and it is also possible for the attenuation body to be formed from more or less than six mats.

The attenuation body 2 is perforated in the flow direction, that is to say, it has a multiplicity of openings 27 in hole form. The absorber material is accordingly shaped so as to form both the ducts as well as the sound-absorbing walls.

According to an exemplary embodiment, the unipartite attenuation body can be provided in the desired shape by foaming, whereas the attenuation mats together with perforation can be punched out of plates of attenuation material in an inexpensive manner.

According to an exemplary embodiment of the present disclosure, the attenuation body 2 is inserted into the sound attenuator housing 10 in the flow direction (e.g., in the direction of the central axis in the case of a circular housing cross section). Here, the attenuation body can be inserted through the inlet opening 11, or from the opposite direction, for example, in the case of a two-part sound attenuator housing.

The attenuation body is held in the axial direction by means of a perforated holding plate 31, wherein the holding plate can extend over the entire pipe cross section or can cover only parts thereof. Here, the perforation can correspond to the perforation of the attenuation body, or else can be more coarse-meshed than the perforation of the attenuation body, by virtue of a hole in the holding plate extending across multiple holes in the attenuation body. The holding plate of the type can be provided on both sides of the attenuation body (e.g., on the downstream side toward the outlet opening and on the inlet side). On the inlet side, the holding plate can be combined with the filter such that the filter spanned across the inlet opening performs the holding function for the attenuation body.

The sound attenuator housing 10 has a larger cross section in the region of the attenuation body 2 than downstream in the region of the outlet opening. The housing accordingly tapers, downstream of the sound attenuator, toward the compressor inlet in order to supply the flow to the compressor wheel.

The hole cross section of the perforation and the form, the web thickness and the overall length of the attenuation body in the flow direction can be selected such that the required attenuation is achieved. The number and form of the holes and the overall cross section of all of the holes can be selected in accordance with the volume flow and the permitted pressure loss.

The sum of all of the inlet openings of the perforation in the attenuation body can correspond at least to the area of the outlet opening of the sound attenuator housing.

According to an exemplary embodiment, the holes in the attenuation body can be distributed in an irregular fashion and/or can have cross sections of different shape and/or different size. Accordingly, owing to the different sound level distribution across the cross section, it can under some circumstances be advantageous for the holes in the outer region to have a larger cross-sectional area than the holes in the central, inner part of the attenuation body. Sound level distributions can, however, be conceived in which the outer holes have a smaller cross-sectional area than the inner holes.

Figure 7:
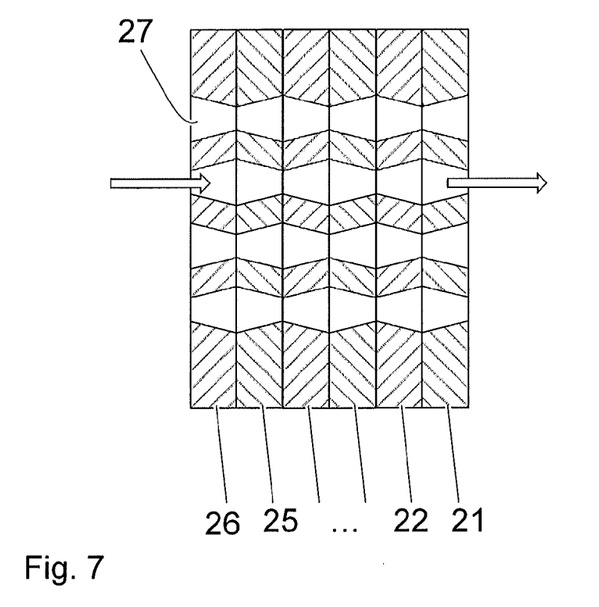
FIGS. 7 and 8 show exemplary embodiments of the attenuation body of the sound attenuator in FIG. 2.

According to an exemplary embodiment, the holes in the attenuation body can have a cross section which is non-constant in the flow direction. For example, the holes can run in a convergent manner in the flow direction. If the attenuation body is formed by multiple attenuation mats, the holes can have different cross-sectional areas from mat to mat, as schematically illustrated in FIG. 7, whereby the absorption area can be increased.

Figure 8:
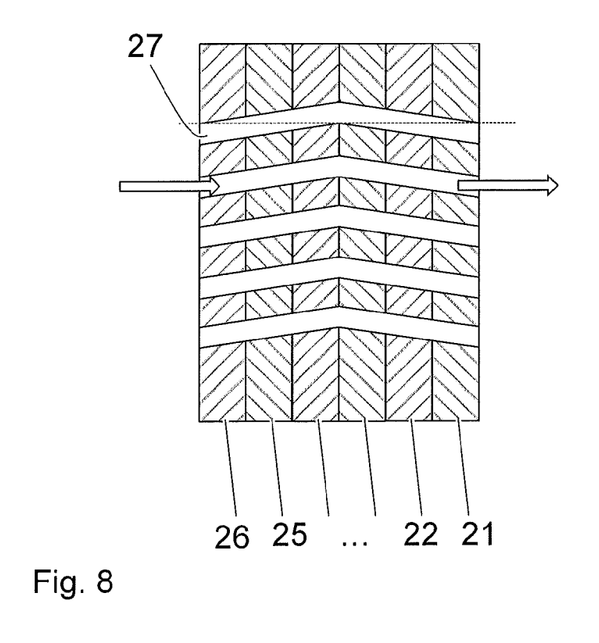

According to an exemplary embodiment, as schematically illustrated in FIG. 8, the holes in the attenuation body can extend in a manner deviating from the flow direction such that there is no line of sight through the inlet opening and outlet opening of the hole in the flow direction. Here, the respective holes can be curved or provided with a bend.

Figures 9A, 9B:
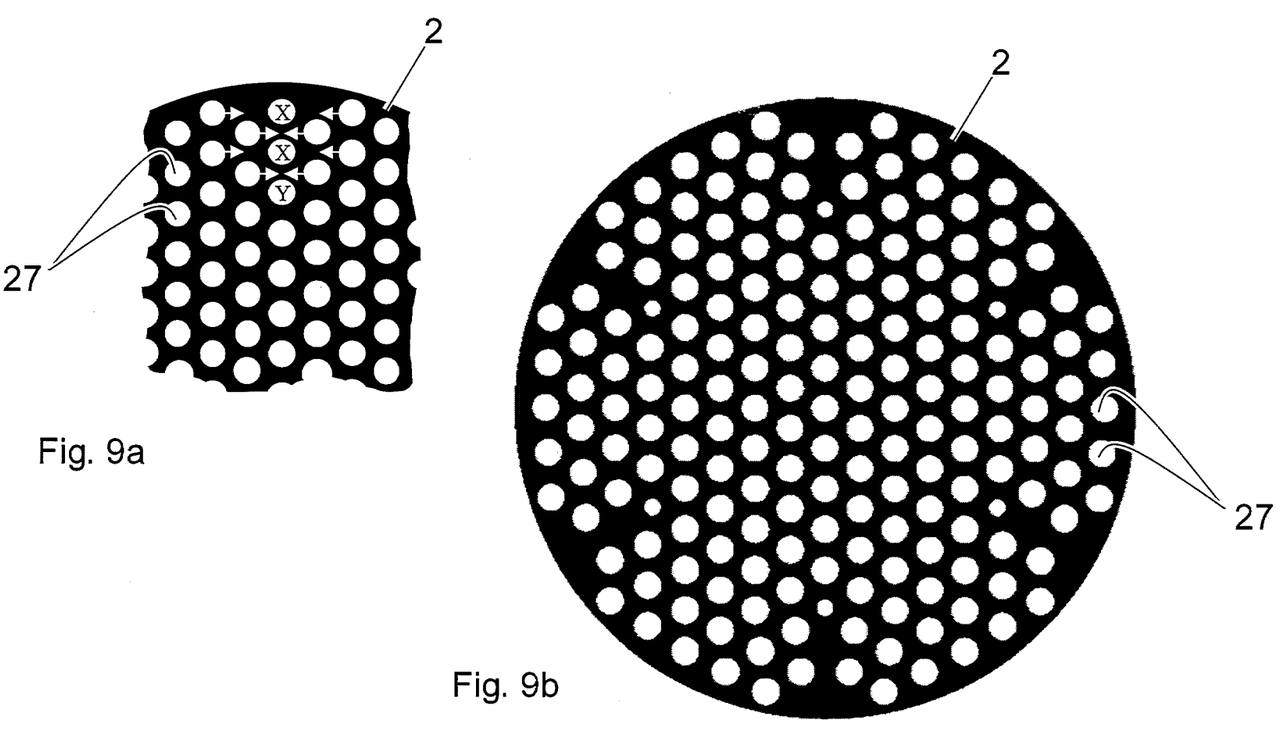

Another exemplary embodiment for the arrangement of the holes in the attenuation body is schematically illustrated in FIG. 9b. The starting point of this embodiment is the hole arrangement with the densest packaging as per the detail in FIG. 9a, in which the circular holes can be in each case spaced apart at uniform intervals of 60° angle from one another. By means of this arrangement, it is possible for the largest possible intake cross section (hole fraction) across the overall cross section to be ensured, and for the sound attenuator to nevertheless be kept small. The arrangement according to the present disclosure of the holes in the attenuation body as per the exemplary embodiment in FIG. 9b solves the problem that, in the case of the hole arrangement with the densest packaging, there is 60°-angle symmetry and, secondly, the open hole area averaged over the radius, that is to say the hole area fraction on a radial line extending from the center of the attenuation body, varies with respect to angle. The variation of the hole area distribution in combination with the 60°-cycle symmetry can generate a sixth order excitation of the compressor blades downstream of the sound attenuator. The sixth order excitation arises from the uneven distribution of the inflowing air, or of the inflowing medium, with respect to angle. Specifically, it has been found that, by means of the hole arrangement, the amount of medium drawn in varies with respect to angle, the variation in part being very significant.

In the case of the hole arrangement according to the exemplary embodiment of the present disclosure illustrated in FIG. 9b, the primary concern is for the open sound attenuator area averaged over the radius, that is to say the hole area fraction on a radial line extending from the center of the attenuation body, to be as constant as possible with respect to angle. Taking the above-described densest packaging of the hole arrangement as per FIG. 9a as a starting point, holes can be omitted in order to distribute the intake air more uniformly, with respect to angle, over the cross section. This consequently relates to those holes which can be closest together in the radial direction. The holes can be omitted preceding inward from the outer edge, wherein the number of omissions is determined by the size of the sound attenuator. The omission results in an extreme reduction in excitation, wherein, with small cosmetic re-corrections, the excitations can almost be completely dampened. The cosmetic re-corrections can include, for example, moving the holes adjacent to the omitted holes closer together. In the exemplary embodiment of FIG. 9b, taking the densest packaging as a starting point, the three holes designated X and Y in FIG. 9a can be omitted preceding from the outside, with the respective adjacent holes being moved slightly closer together, as indicated by the arrows. The third hole designated Y has been reintroduced with a smaller diameter. Now, considering a radial line extending from the center of the attenuation body, the result is a hole area fraction which, according to an exemplary embodiment of the present disclosure, has a substantially constant value for every angular position of the line.

The sound attenuator illustrated has a circular cross-sectional form with a central axis. It is, however, also conceivable for the cross-sectional form of the sound attenuator housing to deviate from the circular form partially or over the entire length. Accordingly, it would, for example, be possible for the region of the inlet opening and of the attenuation body to be of oval, rectangular or very generally polygonal form.

It will be appreciated by those skilled in the art that the present invention can be embodied in other specific forms without departing from the spirit or essential characteristics thereof. The presently disclosed embodiments can be therefore considered in all respects to be illustrative and not restricted. The scope of the invention is indicated by the appended claims rather than the foregoing description and all changes that come within the meaning and range and equivalence thereof can be intended to be embraced therein.

LIST OF REFERENCE SIGNS

1 Sound attenuator
10 Sound attenuator housing
11 Inlet opening
12 Outlet opening
2 Attenuation body
21-26 Attenuation mats
27 Holes, perforation
31, 32 Perforated holding plate
7 Compressor
71 Air inlet of the compressor
72 Air outlet of the compressor
8 Bearing housing
9 Exhaust gas turbine
91 Gas inlet of the exhaust-gas turbine
92 Gas outlet of the exhaust-gas turbine
F Flow direction

What is claimed is:

1. A sound attenuator on an intake side of a compressor of an exhaust-gas turbocharger, comprising:
a tubular sound attenuator housing which encases a flow duct between a face-side inlet opening and a rear-side outlet opening, a flow through the sound attenuator being directed from a central point of the inlet opening to a central point of the outlet opening; and
an attenuation body inserted into the sound attenuator housing in a direction of the flow, the attenuation body being perforated in the flow direction so as to have a plurality of holes extending in the flow direction, the attenuation body being divided into a plurality of attenuation mats arranged one behind the other in the flow direction, the attenuation mats each being oriented to extend in the flow direction such that the attenuation mats each extend in the same direction along a longitudinal extent of the attenuation body.

2. The sound attenuator as claimed in claim 1, comprising: positioning means for defining an angular position of the attenuation body with respect to the sound attenuator housing perpendicular to the flow direction.

3. The sound attenuator as claimed in claim 2, wherein the positioning means comprise a pin, which is fastened to a holding plate for holding the attenuation body at least one of in the sound attenuator housing and to the sound attenuator housing, and a positioning hole, provided for the pin, in one of the attenuation body and the attenuation mats.

4. The sound attenuator as claimed in claim 1, comprising: positioning means for defining a position of the attenuation mats relative to one another with regard to their perforation.

5. The sound attenuator as claimed in claim 4, wherein the positioning means comprise a pin, which is fastened to a holding plate for holding the attenuation body at least one of in the sound attenuator housing and to the sound attenuator housing, and a positioning hole, provided for the pin, in one of the attenuation body and the attenuation mats.

6. The sound attenuator as claimed in claim 1, wherein the holes in the attenuation body have different cross sections than one another.

7. The sound attenuator as claimed in claim 6, wherein the holes in the attenuation body in an edge region of the flow duct have larger cross sections than holes in the attenuation body in a central portion of the flow duct.

8. The sound attenuator as claimed in claim 6, wherein the holes in the attenuation body in an edge region of the flow duct have smaller cross sections than holes in the attenuation body in a central portion of the flow duct.

9. The sound attenuator as claimed in claim 7, wherein the holes in the attenuation body are arranged to have cross-sectional areas that differ from one another, such that a hole area fraction summed up over a length of a radial line extending from the central portion of the flow duct has a constant value regardless of an angle of the line.

10. The sound attenuator as claimed in claim 8, wherein the holes in the attenuation body are arranged to have cross-sectional areas that differ from one another, such that a hole area fraction summed up over a length of a radial line extending from the central portion of the flow duct has a constant value regardless of an angle of the line.

11. A sound attenuator on an intake side of a compressor of an exhaust-gas turbocharger, comprising:
a tubular sound attenuator housing which encases a flow duct between a face-side inlet opening and a rear-side outlet opening, a flow through the sound attenuator being directed from a central point of the inlet opening to a central point of the outlet opening; and
an attenuation body inserted into the sound attenuator housing in a direction of the flow, the attenuation body being is perforated in the flow direction so as to have a plurality of holes extending in the flow direction, the attenuation body being divided into a plurality of attenuation mats arranged one behind the other in the flow direction,
wherein the holes in the attenuation body are arranged to have cross-sectional areas that differ from one another, such that a hole area fraction summed up over a length of a radial line extending from a central portion of the flow duct has a constant value regardless of an angle of the line.

12. The sound attenuator as claimed in claim 1, wherein at least one of the holes in the attenuation body has a cross section which is non-constant in the flow direction.

13. The sound attenuator as claimed in claim 1, wherein at least one of the holes extends in a manner deviating from the flow direction such that there is no line of sight through the inlet opening and outlet opening of the at least one of the holes in the flow direction.

14. The sound attenuator as claimed in claim 1, wherein the attenuation body and the sound attenuator housing have one of a circular, oval and polygonal cross section in a region of the attenuation body.

15. The sound attenuator as claimed in claim 14, wherein the sound attenuator housing has, in the region of the attenuation body, a cross-sectional area larger than an area of the outlet opening of the sound attenuator housing.

16. The sound attenuator as claimed in claim 1, wherein the sound attenuator housing has, in a region of the attenuation body, a cross-sectional area larger than an area of the outlet opening of the sound attenuator housing.

17. The sound attenuator as claimed in claim 1, comprising at least one perforated holding plate configured to hold the attenuation body in the sound attenuator housing.

18. The sound attenuator as claimed in claim 1, wherein the sound attenuator housing has a filter.

19. The sound attenuator as claimed in claim 11, wherein:
the holes in the attenuation body have different cross sections than one another ;
the holes in the attenuation body in an edge region of the flow duct have smaller cross sections than holes in the attenuation body in a central portion of the flow duct; and
the holes in the attenuation body are arranged to have cross-sectional areas that differ from one another, such that a hole area fraction summed up over a length of a radial line extending from the central portion of the flow duct has a constant value regardless of an angle of the line.

20. The sound attenuator as claimed in claim 11, wherein:
the holes in the attenuation body have different cross sections than one another;
the holes in the attenuation body in an edge region of the flow duct have smaller cross sections than holes in the attenuation body in a central portion of the flow duct; and
the holes in the attenuation body are arranged to have cross-sectional areas that differ from one another, such that a hole area fraction summed up over a length of a radial line extending from the central portion of the flow duct has a constant value regardless of an angle of the line.

* * * * *